United States Patent
Chen (10) Patent No.: US 12,302,857 B2
(45) Date of Patent: May 20, 2025

(54) ANIMAL KEEPING DEVICE AND EQUIPMENT

(71) Applicant: EGUMA INC., New York, NY (US)

(72) Inventor: Haoran Chen, Guangzhou (CN)

(73) Assignee: EGUMA INC, New York, NY (US)

( * ) Notice: Subject to any disclaimer, the term of this patent is extended or adjusted under 35 U.S.C. 154(b) by 13 days.

(21) Appl. No.: 18/367,371

(22) Filed: Sep. 12, 2023

(65) Prior Publication Data
US 2025/0057109 A1 Feb. 20, 2025

(30) Foreign Application Priority Data

Aug. 14, 2023 (CN) .......................... 202322173381.0

(51) Int. Cl.
*A01K 1/03* (2006.01)
(52) U.S. Cl.
CPC .................................... *A01K 1/033* (2013.01)
(58) Field of Classification Search
CPC ........ A01K 1/032; A01K 1/033; A01K 1/034; A01K 1/03
See application file for complete search history.

(56) References Cited

U.S. PATENT DOCUMENTS

| | | | | | |
|---|---|---|---|---|---|
| 3,774,576 | A | * | 11/1973 | Moore | A01K 1/03 119/480 |
| 5,216,977 | A | * | 6/1993 | Allen, Jr. | A01K 1/033 119/500 |
| 5,551,371 | A | * | 9/1996 | Markey | A01K 1/033 119/482 |
| 6,810,833 | B2 | * | 11/2004 | Bonner | A01K 63/003 119/455 |
| 12,029,199 | B2 | * | 7/2024 | Cui | A01K 1/033 |
| 2005/0241591 | A1 | * | 11/2005 | Ingley, III | A01K 1/031 119/455 |
| 2012/0199080 | A1 | * | 8/2012 | Siddons | A01K 1/033 119/448 |

FOREIGN PATENT DOCUMENTS

| | | |
|---|---|---|
| CN | 103960145 A | 8/2014 |
| CN | 213343869 U | 6/2021 |
| CN | 213523390 U | 6/2021 |

* cited by examiner

*Primary Examiner* — Christopher D Hutchens
*Assistant Examiner* — Nevena Aleksic
(74) *Attorney, Agent, or Firm* — Nitin Kaushik (57) ABSTRACT

This application discloses an animal keeping device and equipment, which comprises: top cover, middle enclosure, base, and conductive components; the top cover is equipped with a first integrated component; the middle enclosure has openings at both ends; the base is provided with a second integrated component; the top cover and base are respectively encapsulated in the openings at both ends of the middle enclosure, and the conductive component is encapsulated and fixed inside the middle enclosure and partially exposed on the surface of the middle enclosure. The conductive component is used for line connection; after the top cover, middle enclosure, and base are assembled and fixed, the first integrated component is connected to the second integrated component through a conductive component.

11 Claims, 11 Drawing Sheets

ANIMAL KEEPING DEVICE AND EQUIPMENT

CROSS-REFERENCE TO RELATED APPLICATIONS

The application claims priority to Chinese patent application No. 2023221733810, filed on Aug. 14, 2023, the entire contents of which are incorporated herein by reference.

TECHNICAL FIELD

This application belongs to the technical field of animal products, specifically relating to an animal keeping device and equipment.

BACKGROUND

With the development of the times and the transformation of people's lifestyles, keeping animals indoors has become the choice for more and more people. Therefore, various animal keeping devices have been extensively applied. Pet boxes and ecological boxes are widely used for animal living, playing and other scenes.

In related technologies, in order to create a comfortable living environment for animals living in it, animal keeping devices that can achieve lighting, temperature, and other conditions have emerged. However, in these devices, various functional components are mostly set in zones. Due to the need for each functional component to be powered on, the circuit settings are often staggered. It not only poses safety hazards, but also affects future product maintenance and beauty.

Therefore, there is an urgent need to propose an animal keeping device that can solve the above-mentioned problem of circuit setting.

SUMMARY

The purpose of this application is to provide an animal keeping device that can solve the above line setting problems.

In the first aspect, in order to achieve its purpose, the technical solution adopted in this application is as follows:
an animal keeping device, comprising:
  a top cover; the top cover is provided with a first integrated component for maintaining internal environmental parameters of the animal keeping device;
  a middle enclosure, with openings at both ends;
  a base, with a second integrated component used to maintain the internal environmental parameters of the animal keeping device;
  the top cover and the base are respectively encapsulated in the openings at both ends of the middle enclosure to jointly enclose and form a storage space for animal keeping;
  a conductive component; the conductive component is encapsulated and fixed inside the middle enclosure and partially exposed on the surface of the middle enclosure. The conductive component is used for line connection;
  after the top cover, middle enclosure, and base are assembled and fixed, the first integrated component is connected to the second integrated component through a conductive component.

Compared with the prior art, the present application has the following benefits:

The animal keeping device proposed in this application provides a detachable animal keeping device by setting a top cover, a middle enclosure, and a base; And there is a conductive component installed inside the middle enclosure for line conduction, which enables the top cover and base to be assembled and connected through the middle enclosure. The components inside the top cover and base can be electrically connected through the conductive component, avoiding situations such as exposed lines and staggered lines. This effectively solves the problem of line setup, improves product beauty, and also facilitates the product maintenance.

In the second aspect, the present application also provides an animal keeping device, which comprises at least two animal keeping devices as described in the first aspect and a heterogeneous power-on component. At least two animal keeping devices are stacked along the central axis direction of the base and the top cover, and at least two animal keeping devices are contacted by a heterogeneous power-on component for the electrical connection between at least two animal keeping devices.

The animal keeping device provided in this application can effectively improve space utilization, allowing users to place multiple animal keeping devices in a vertical space, and avoiding the problem of multiple animal keeping devices requiring independent wiring.

BRIEF DESCRIPTION OF DRAWINGS

In order to illustrate technical schemes in the examples of the application or the prior art more clearly, figures needed for describing the examples or the prior art will be simply introduced below, obviously, the figures described below are only some examples of the application, and as for those of ordinary skill in the art, other figures can be obtained according to the structures shown in the figures on the premise of not contributing creative labor.

DESCRIPTION OF SYMBOLS

100. Animal keeping device; 10. Top cover; 11. First integrated component; 20. Middle enclosure; 30. Base; 31. Second integrated component; 33. Upper shell of base; 34. Lower shell of base; 40. Conductive component; 41. Conductive end seat; 42. Conductive wire group; 43. Top cover matching end seat; 44. Base matching end seat; 21. Column; 220. Enclosure board; 12. Foolproof structure; 121. Protruding bar; 122. Central hole; 50. Mounting bolt; 501. Threaded installation groove; 502. Mounting hole; 503. Hollow inner groove; 210. Conduction groove; 211. Insertion groove; 311. Heating pad; 312. Display; 313. Adjusting knob; 32. Foot; 320. Foot groove; 601. Clamping groove; 602. Activity buckle; 2201. Handle;

200. Animal keeping equipment; 300. Heterogeneous power-on component; 301. First electrified end; 302. Second electrified end; 303. Electrified connection seat; 3031. Electrified shrapnel; 111. Exhaust fan; 112. Lighting module.

Purpose implementation, functional characteristics and advantages of the application are further illustrated in combination with the examples and with reference to the figures.

DETAILED DESCRIPTION OF THE EMBODIMENTS

The technical schemes in the examples of the application will be described clearly and completely in combination with the attached drawings in the examples of the application below, and obviously, the described examples are only part of the examples of the application, and are not all of the examples. Based on the example of the application, all other examples acquired by the ordinary technicians in the art without inventiveness, should be in the protection scope of the application.

Referring to FIGS. 1 to 6, an example t of the present application provides an animal keeping device 100, comprising a detachable top cover 10, a middle enclosure 20, and a base 30. The top cover 10 is provided with a first integrated component 11 for maintaining the internal environmental parameters of the animal keeping device 100; the middle enclosure 20 has openings at both ends; the base 30 is equipped with a second integrated component 31 for maintaining the internal environmental parameters of the animal keeping device 100; during assembly, the top cover 10 and the base 30 are respectively enclosed in the openings at both ends of the middle enclosure 20 to jointly enclose and form a storage space for animal keeping.

Referring to FIGS. 1 to 6, this example further includes a conductive component 40, which is encapsulated and fixed inside the middle enclosure 20 and partially exposed on the surface of the middle enclosure 20. The conductive component 40 is used for line connection; after the top cover 10, middle enclosure 20, and base 30 are assembled and fixed, the first integrated component 11 is connected to the second integrated component 31 through a conductive component 40.

The animal keeping device 100 proposed in this application provides a detachable animal keeping device 100 by setting a top cover 10, a middle enclosure 20, and a base 30; And there is a conductive component 40 installed inside the middle enclosure 20 for line conduction, which enables the top cover 10 and base 30 to be assembled and connected through the middle enclosure 20. The components inside the top cover 10 and base 30 can be electrically connected through the conductive component 40, avoiding situations such as exposed lines and staggered lines. This effectively solves the problem of line setup, improves product beauty, and also facilitates the product maintenance.

Among the existing pet keeping devices, most of them are box structures that can be assembled and disassembled without intelligent components and only have independent spatial functions; Based on the considerations of assembly accuracy, convenience and safety, most pet keeping devices equipped with intelligent components that need to be powered on are designed as non-detachable structures; In this example, the first integrated component 11 and the second integrated component 31 are preset inside the top cover 10 and the base 30, respectively, and are equipped with a middle enclosure 20 that matches the top cover 10 and the base 30. Users only need to assemble and fix the top cover 10, the middle enclosure 20, and the base 30 in sequence to complete the intelligent pet keeping device, effectively reducing the difficulty of users assembling their own pet keeping devices; And its detachable structure allows this pet keeping device to effectively reduce space occupancy and reduce transportation and storage costs during the production, transportation, and storage processes.

Referring to FIGS. 3 to 6, in one example, the conductive component 40 includes at least two conductive end seats 41 and a conductive wire group 42 connected at both ends to connect the lines between the two conductive end seats 41. The two conductive end seats 41 are respectively arranged at the two ends of the middle enclosure 20, the top cover 10, and the base 30, and are opposite to each other; The conductive component 40 also comprises a top cover matching end seat 43 and a base matching end seat 44 respectively arranged at two conductive end seats 41 corresponding to the top cover 10 and the base 30. The first integrated component 11 is electrically connected to the top cover matching end seat 43, and the second integrated component 31 is electrically connected to the base matching end seat 44.

Referring to FIGS. 1 to 6, after the top cover 10, the middle enclosure 20, and the base 30 are assembled and fixed, the top cover matching end seat 43 is connected to the conductive end seat 41 located at the end of the middle enclosure 20 and the top cover 10 assembly, and the base matching end seat 44 is connected to the conductive end seat 41 located at the end of the middle enclosure 20 and the base 30 assembly, in order to electrically connect the first integrated component 11 with the second integrated component 31.

By setting conductive end seats 41 at the two ends where the middle enclosure 20 contacts the top cover 10 and the base 30, and hiding the conductive wire group 42 inside the middle enclosure 20, the wires are not visible outside the middle enclosure 20, thereby improving the overall appearance of the product. Furthermore, the design of the conductive end seat 41 and the top cover matching end seat 43, as well as the base matching end seat 44, improves the convenience of the disassembly and assembly process of the animal keeping device 100. The user has fewer installation steps and lower dispersion of various components, reducing the difficulty of installation.

For example, the conductive end seat 41 can be set as a pin seat with several pins, and the top cover matching end seat 43 and the base matching end seat 44 are both equipped with a corresponding pin seat that matches the aforementioned pin seat. Several pins are inserted into the pin seat and electrically connected to the conductive wire group 42 inside the middle enclosure 20. The jack is provided with a conductive terminal which matches with several pins one by one and can be electrically connected with several pins one by one when the pin seat is connected with the jack seat in a pair way. The conductive terminal is connected with the internal lines of the top cover 10 and the base 30 respectively, so that the top cover 10 and the base 30 can realize line connection through the middle enclosure 20 after the middle enclosure 20 is assembled and fixed with the top cover 10 and the base 30 at the same time. Furthermore, this animal keeping device adopts an external power supply, and the power cord can be connected to the base 30 or top cover 10 as appropriate; when the power cord is connected to an external power source, the current can be connected to the top cover 10 through the base 30 connected to the power cord and the middle enclosure 20; alternatively, the current can be connected to the base 30 through the top cover 10 connected to the power cord and connected to the middle enclosure 20 for the power-on operation of the entire animal keeping device.

Figure 1:
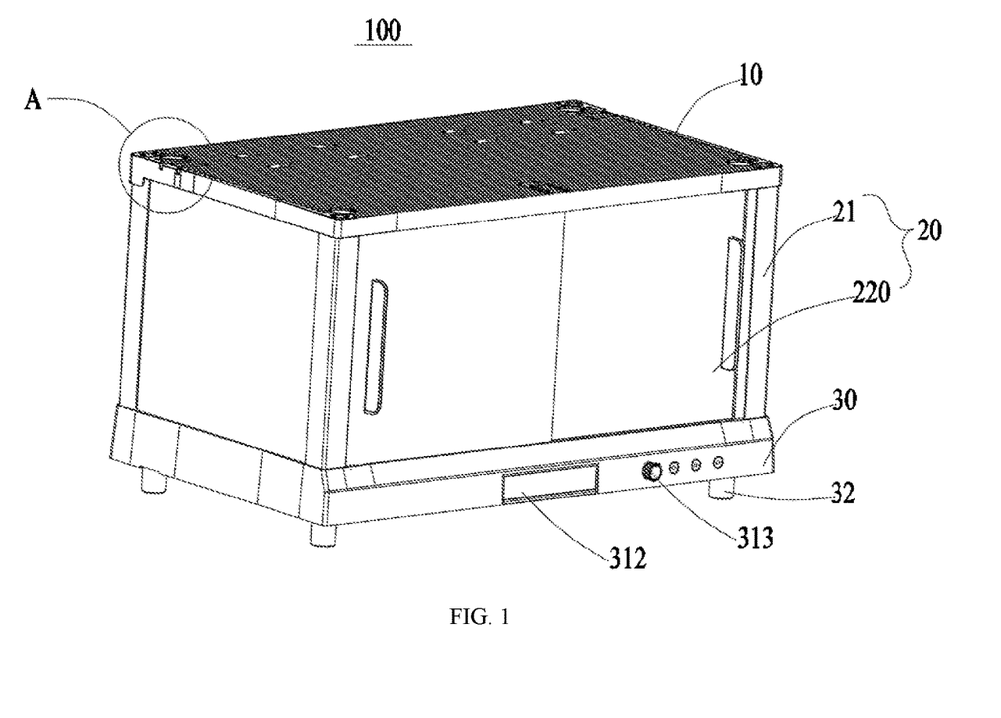
FIG. 1 is a three-dimensional structural schematic diagram of the animal keeping device in an example of the present application.
Figure 3:
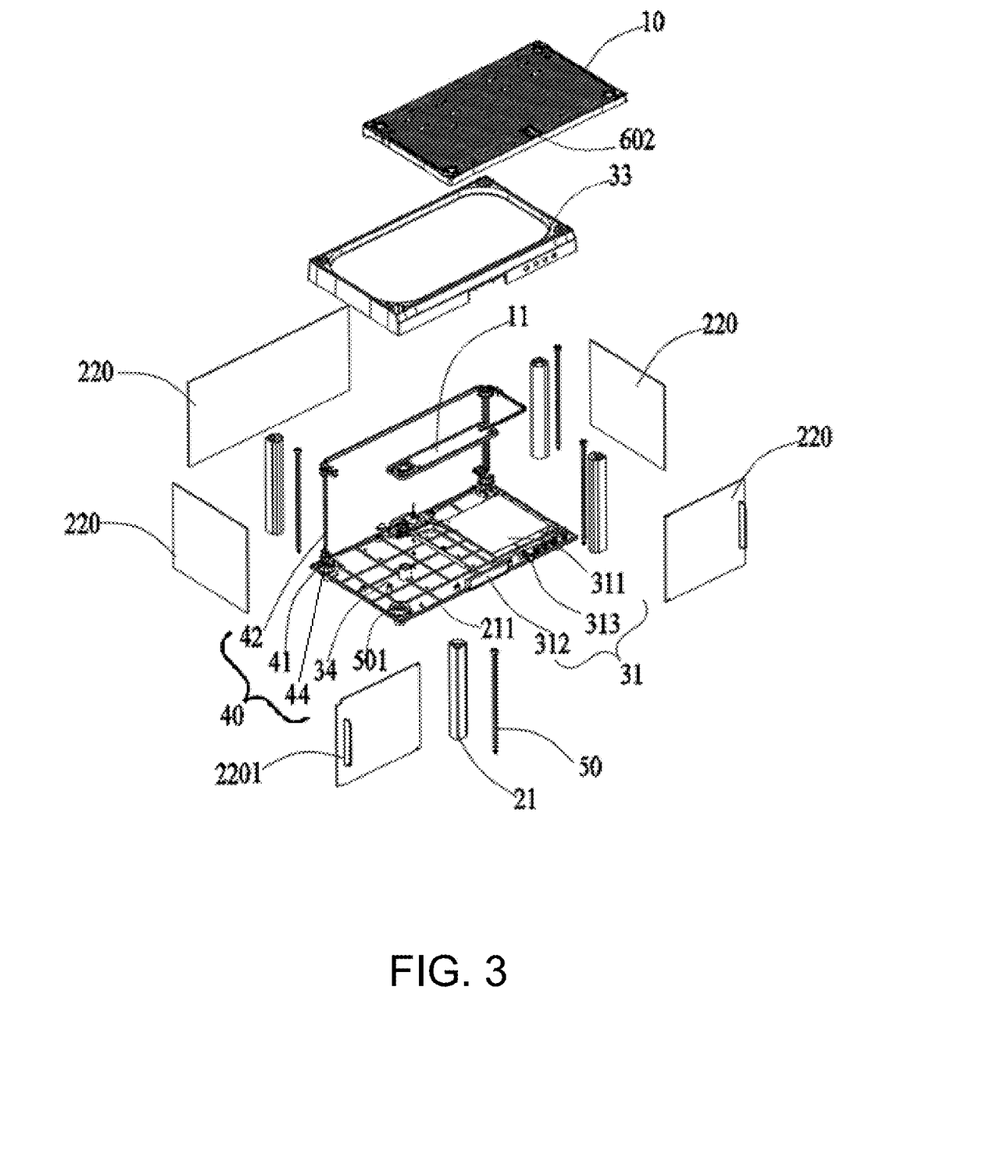
FIG. 3 is a schematic diagram of the breakdown structure of the animal keeping device in an example of the present application.
Figure 4:
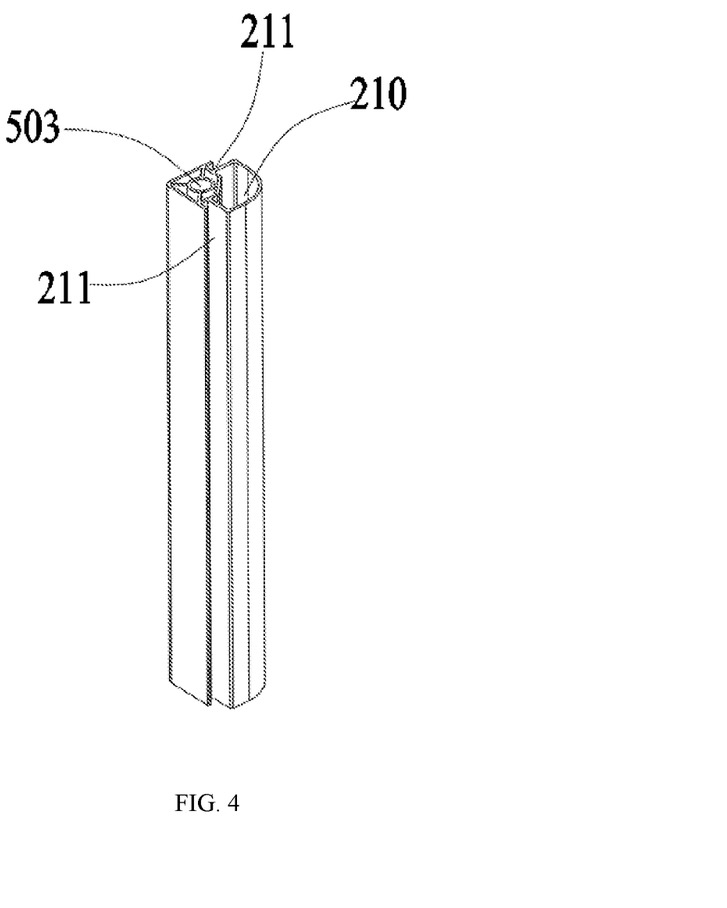
FIG. 4 is a schematic diagram of the column structure of the animal keeping device in an example of the present application.

Referring to FIGS. 1, 3, and 4, in one example, the middle enclosure 20 comprises at least one column 21 and an enclosure board 220 fixed along the length direction of the column 21 and extending away from the column 21, and the other end of the enclosure board 220 is connected to the column 21 to form an enclosure structure with openings at both ends after the column 21 and the enclosure board 220 are enclosed; Two conductive end seats 41 are respectively arranged at both ends of the column 21 along its length direction, and the conductive wire group 42 is encapsulated and arranged inside the column 21. For example, the top cover 10 and the base 30 can be arranged in a circular plate-like structure, and the middle enclosure 20 is correspondingly arranged in a cylindrical structure to adapt to the top cover 10 and the base 30. The enclosure board 220 is arranged as a curved structure that is flattened into a rectangle, and any two opposite side edges of the curved structure are fixed to the column 21 at the same time, thereby forming a cylindrical structural component with upper and lower openings after being fixed through the connection of the column 21. It can be understood that the above is one of the embodiments of the middle enclosure 20 proposed in this application, where the curved structure refers to the structure with a curved surface that can be formed after the enclosure board 220 is fixedly connected to the column 21. In other words, the enclosure board 220 can be a structure that shows itself as a curved surface in State of nature, or a rectangular structure made of materials with bendable characteristics. This rectangular structure can bend under certain external forces to form a structure with curved surfaces.

Figure 5:
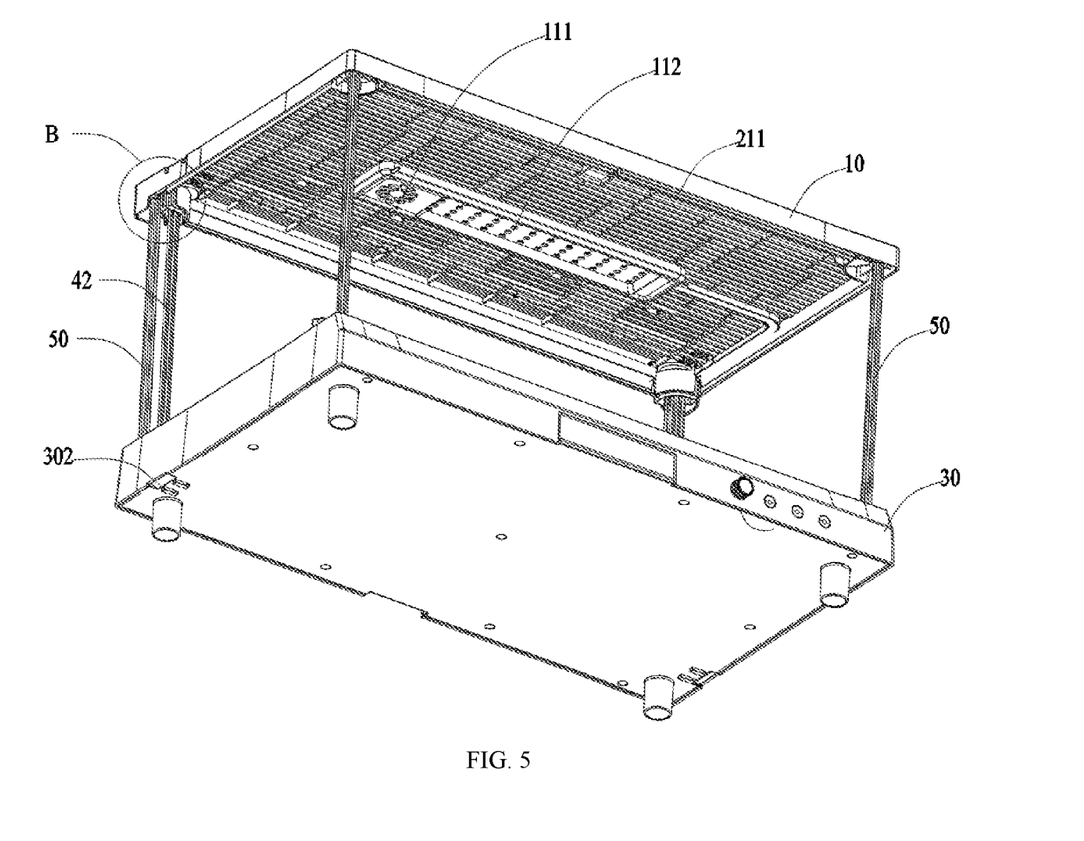
FIG. 5 is a structure diagram of the animal keeping device in an example of the present application after removing the middle enclosure.

Referring to FIGS. 1, 3, and 5, in an example, four columns 21 are arranged, and the enclosure board 220 includes four enclosure boards 220. The four enclosure boards 220 are sequentially connected in a pairwise manner to form an enclosure structure with openings at both ends. The four columns 21 are fixed between any adjacent two enclosure boards 220 and serve as the connecting axis for the two enclosure boards 220; there are four conductive end seats 41, which are respectively arranged at the two ends of any two columns 21 in their respective length directions. The conductive wire group 42, the top cover matching end seat 43, and the base matching end seat 44 correspond to two columns 21 and are respectively arranged in two groups.

By setting the conductive wire group 42 inside the column 21 and the conductive end seat 41 at the two ends of the column 21, the internal wiring regularity of the animal keeping device 100 is further improved, and the problem of line interleaving is avoided. And the wire group used for conduction is prepackaged inside the column 21, which not only ensures the integrity of the structure after disassembly, but also facilitates user assembly, avoiding the defect of incorrect wiring caused by misunderstanding or mistakes.

In the examples shown in FIGS. 1-6, both the top cover 10 and the base 30 are arranged in a rectangular structure, with four columns 21 located at the four corners of the rectangle. The conductive end seat 41 and the conductive wire group 42 can be arranged in any one or more of the four columns 21. When the animals to be reared have low requirements for environmental conditions, such as the local species, their rest requirements for the surrounding environment are more consistent with the local sunshine, temperature and other conditions, or the animals to be reared have strong survival and adaptability, the corresponding animal keeping devices can use fewer integrated components, and their internal wiring groups and internal wiring can be reduced accordingly. Therefore, the conductive component 40 can be installed in only one column 21, and the entire animal keeping device can be connected through one column 21 to meet its energy supply needs. On the contrary, when the animals to be raised are opposite to the above situation, several additional conductive components 40 can be selected from the four columns 21, and even by simultaneously adding columns 21 and setting conductive components 40 on columns 21, the circuit can be connected and the energy supply needs can be met.

In the examples shown in FIGS. 1-6, the conductive component 40 is arranged on the back of the animal keeping device 100 in its normal use state, that is, the conductive component 40 is arranged on two columns 21 located on the back; In practical applications, the back of the product is usually set against a wall or facing away from the user's operating surface, while setting the conductive wire group 42 and conductive end seat 41 on the back of the product is beneficial for ensuring user electricity safety and avoiding potential leakage accidents after product damage. For example, the enclosure board 220 is made of acrylic material, which is transparent and convenient for users to watch animals. It also has a high anti-scratch coefficient, which can effectively prevent animals from scratching.

Figure 6:
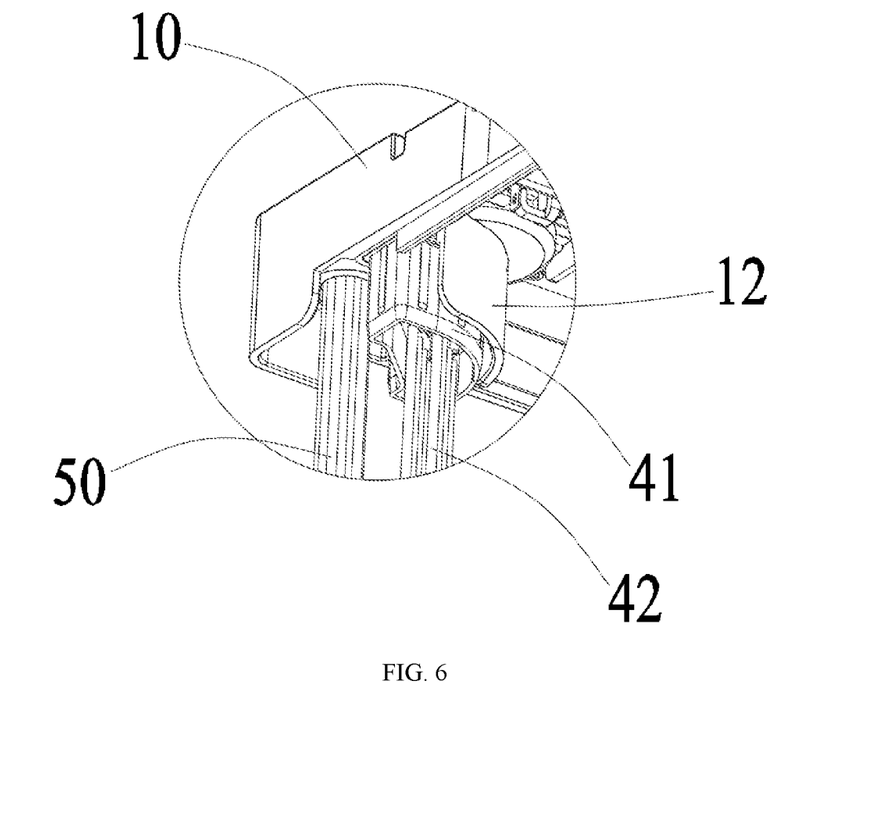
FIG. 6 is a partially enlarged view of location B in FIG. 5.

Referring to FIGS. 5 to 6, in one example, the top cover 10 corresponds to the conductive component 40 and is equipped with a foolproof structure 12. By improving the convenience of user installation through the foolproof structure 12, it can avoid the incorrect insertion of the conductive end seat 41 and the top cover matching end seat 43 due to user installation errors, resulting in damage to the end seat.

Referring to FIGS. 5 to 6, in one example, the foolproof structure 12 is connected to the top cover 10 facing the middle enclosure 20 and extends towards the direction near the middle enclosure 20.

Referring to FIGS. 5 to 6, in one example, the foolproof structure 12 is arranged as a foolproof sheet adapted to the outer edge of the column 21, which is connected to the top cover 10 facing the column 21 and located on the outer circumference of the top cover matching end seat 43. By setting foolproof sheets on the outer circumference of the top cover matching end seat 43 and the outer edge of the column 21, users can align the top cover 10 with the column 21 through the foolproof sheets, thereby improving the installation accuracy of the top cover 10 and the column 21.

Figure 7:
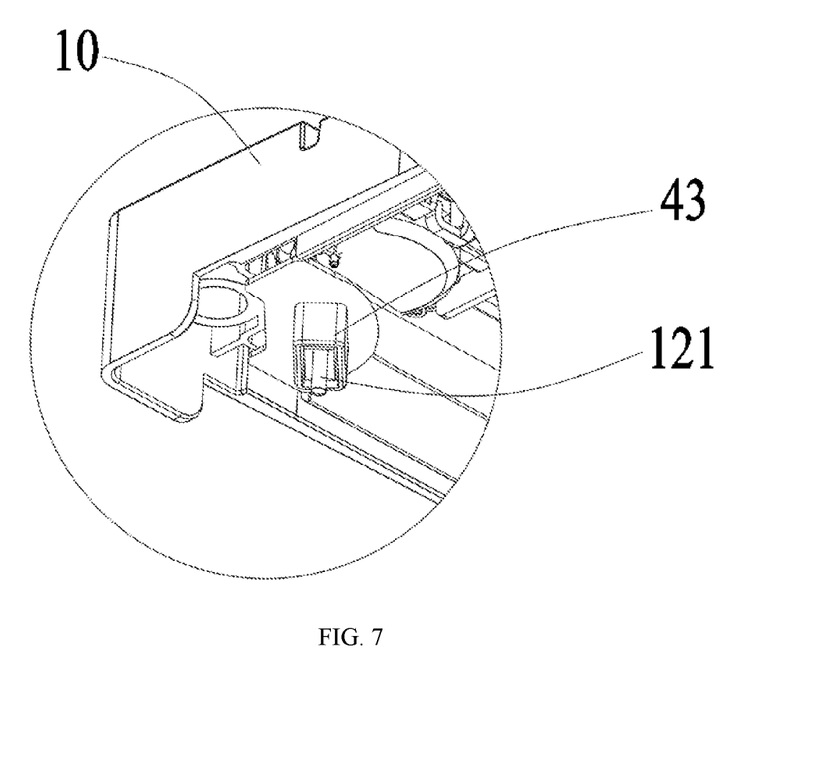
FIG. 7 is a structure diagram 1 of the foolproof structure in another example of the present application.
Figure 8:
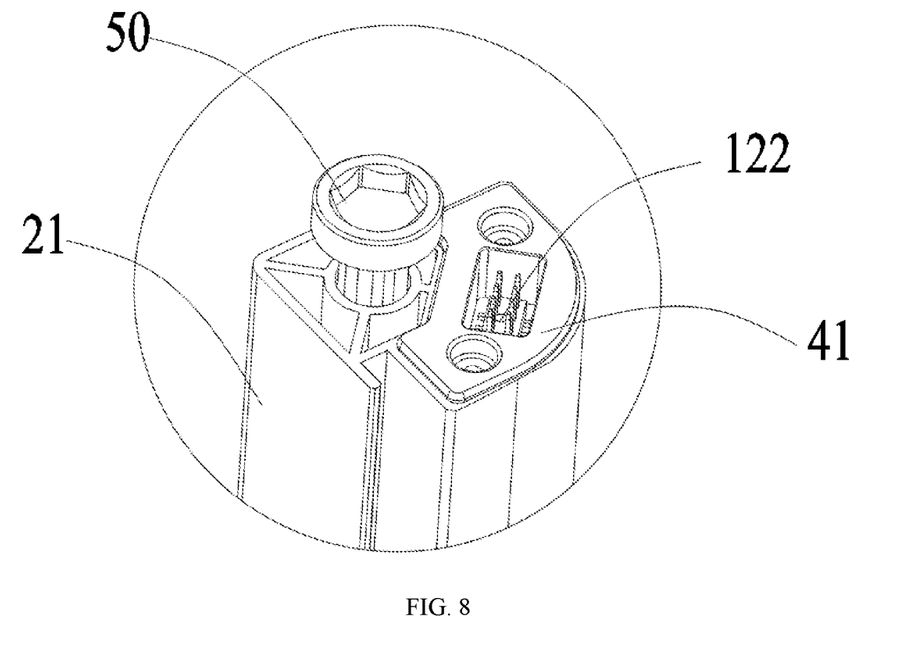
FIG. 8 is a structure diagram 2 of the foolproof structure in another example of the present application.

Referring to FIGS. 7 and 8, in another example, the foolproof structure 12 is arranged as a protruding bar 121 protruding in the direction of the column 21 and coaxial with the column 21. The protruding bar 121 is connected to the top cover 10 facing the column 21 and is located in the center of the top cover matching end seat 43. The conductive end seat 41 is adapted to the protruding bar 121 and is provided with a center hole 122, so that when the top cover 10 is assembled with the column 21, it can be connected to the column 21 through the foolproof structure 12.

Referring to FIGS. 1 to 8, in one example, it also includes a mounting bolt 50 for fixing and connecting the top cover 10, the column 21, and the base 30. The base 30 is equipped with a threaded installation groove 501, and the corresponding threaded installation groove 501 of the top cover 10 is equipped with a mounting hole 502. The column 21 is equipped with a hollow inner groove 503 for the mounting bolt 50 to pass through. The mounting bolt 50 passes through the top cover 10, and the column 21 is threaded to the threaded installation groove 501, so as to press and fix the column 21 between the top cover 10 and the base 30. For example, column 21 is equipped with a conduction groove 210, a conductive wire group 42 is arranged inside the conduction groove 210, the conductive end seat 41 is fixed at both ends of the conduction groove 210, and the hollow inner groove 503 is adjacent to the conducting groove 210 and parallel to the central axis of the conduction groove 210. The mounting bolt 50 can fix the top cover 10, middle enclosure 20 and base 30. Its installation method is simple and has strong stability.

Referring to FIGS. 3 and 5, in an example, the first integrated component 11 includes an exhaust fan 111 and a lighting module 112, and the second integrated component includes a heating pad 311, a display screen 312, an adjusting knob 313 and a temperature and humidity detector. Through the adjusting knob 313, exhaust fan 111, light module 112 and the working mode of heating pad 311 can be adjusted and controlled. For example, the base 30 includes an upper shell 33 and a lower shell 34 (in order to show each component as clearly as possible, the upper shell 33 and the lower shell 34 are shown separately in FIG. 3; however, the relative positional relationships between the components in FIG. 3 do not necessarily represent the relative positional relationships between the components in the final assembled animal keeping device; and for a schematic diagram of the assembled animal keeping device (excluding the enclosure), reference may be made to FIG. 5), and the heating pad 311 is encapsulated inside the upper shell 33 and the lower shell 34 of the base. The heating pad can be set with a timed and constant temperature effect. If the nighttime is set, the temperature inside the box will decrease by 4 degrees after reaching the nighttime, imitating the natural effect of 4 degrees lower temperature at night than during the day. The exhaust fan 111 is used to exhaust the air inside the animal keeping device, so that the animals living in it can enjoy the fresh air; the lighting module 112 is used to simulate natural lighting, and its mode can be adjusted by adjusting knob 313, or it can be selected from preset modes by adjusting knob 313. Temperature and humidity detectors can be used to detect the temperature and humidity inside animal keeping devices, and connect warning devices. When the temperature or humidity reaches the warning value, a reminder will be issued, or corresponding adjustment mechanisms can be set to ensure that the environmental temperature, humidity, and other parameters meet their needs. The mounting bolts are equipped with hexagonal grooves, and the adjusting knob can be pulled out from the base through external force. The inner side has a hexagonal spoon shape that is compatible with the aforementioned hexagonal grooves. The mounting bolts, four columns, top cover, and base can be installed and fixed by adjusting knobs, without the need for additional hexagonal tools.

Figure 9:
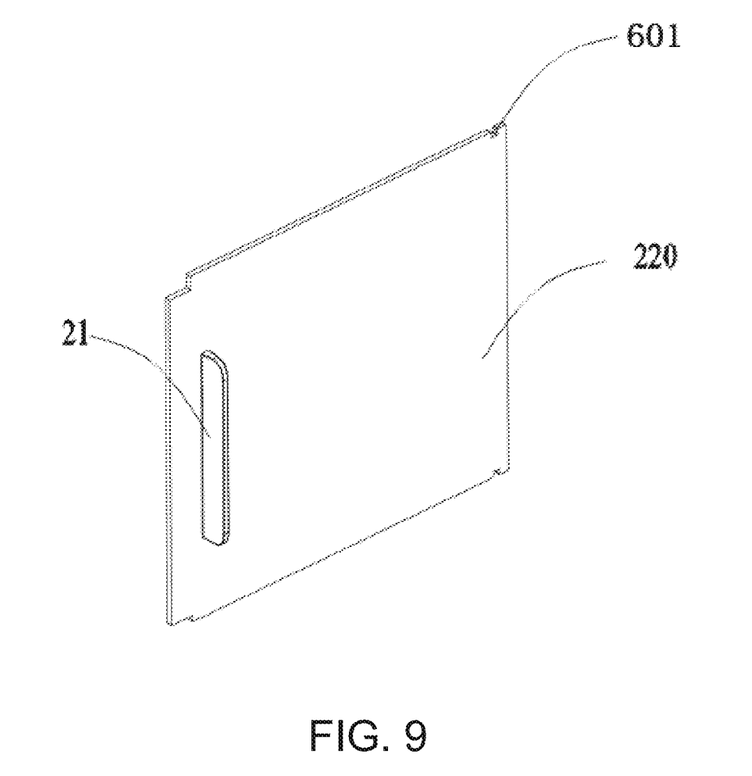
FIG. 9 is a structure diagram of the enclosure board 220 in an example of the present application.

Referring to FIGS. 3, 5, and 9, in one example, the top cover 10, column 21, and base 30 are all equipped with an insertion groove 211 for the insertion of the enclosure board 220. For example, the enclosure board 220 located on the display screen of the animal keeping device is divided into two pieces, and there are clamping groove 601 at the top of the two enclosure boards 220. The top cover 10 corresponds to the clamping groove 601 and is equipped with a movable buckle 602. Moving the movable buckle 602 can fix or detach from the card slot 601, in order to lock or release the enclosure board 220, thereby achieving the purpose of locking and opening the door; Enclosure board 220 can be opened or closed by the sliding door 2201.

Figure 2:
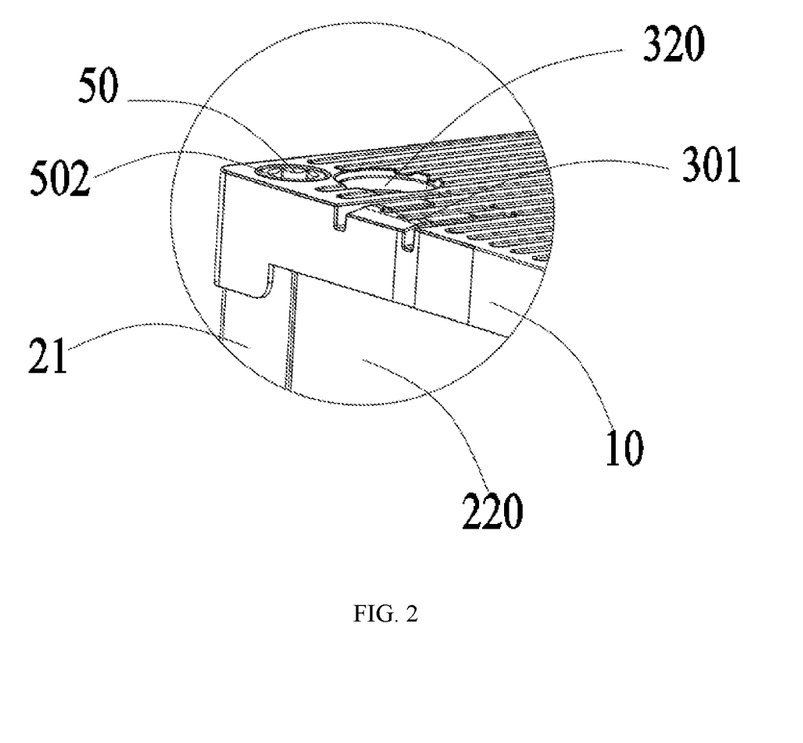
FIG. 2 is a partially enlarged view of location A in FIG. 1.
Figure 10:
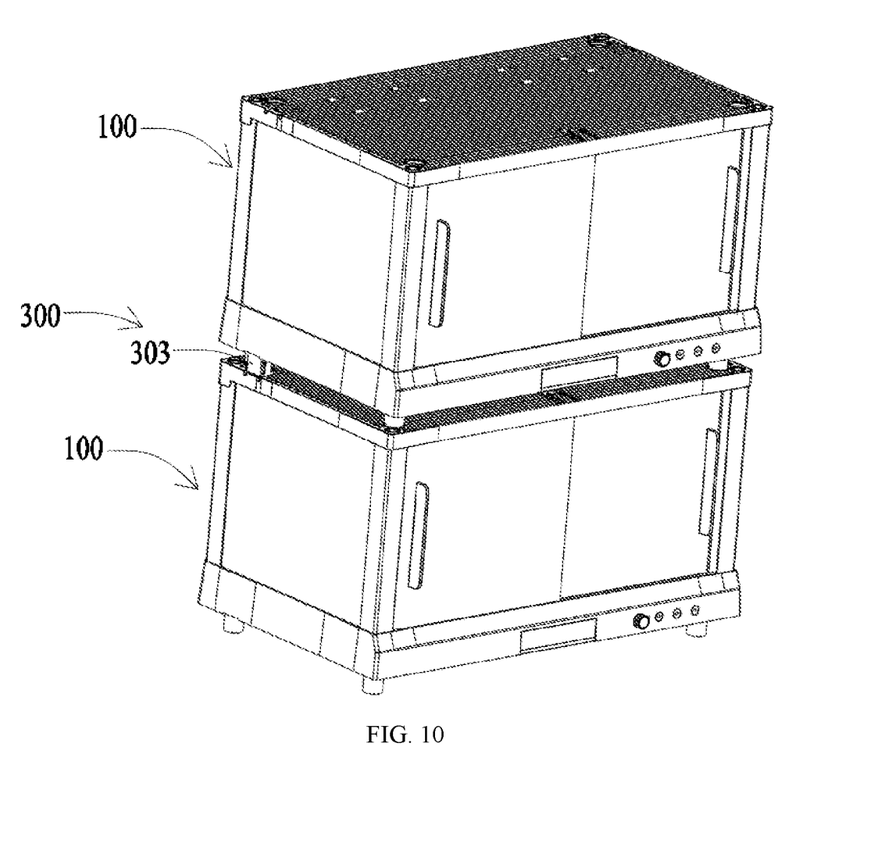
FIG. 10 is a three-dimensional schematic diagram of the animal keeping device in an example of the present application.
Figure 11:
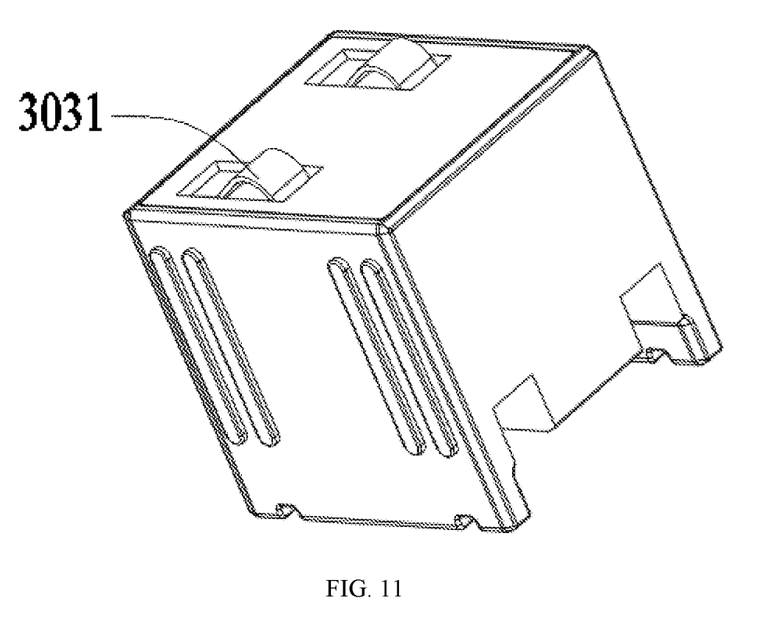
FIG. 11 is a schematic diagram of the three-dimensional structure of the electrified connection seat in an example of the present application.

Referring to FIGS. 1-2 and 10, the present application also provides an animal keeping device 200, which includes at least two animal keeping devices 100 and a heterogeneous power-on component 300 as described in the above example. At least two animal keeping devices 100 are stacked along the central axis direction of the base 30 and the top cover 10. At the contact point of at least two animal keeping devices 100, a heterogeneous power-on component 300 is provided for the electrical connection between at least two animal keeping devices 100. For example, to improve the stability of stacking, a support foot 32 is provided at the bottom of the base 30, and a foot groove 320 corresponding to the foot 32 is provided on the top cover 10. When stacking two animal keeping devices 100, the foot 32 of the upper layer animal keeping device 100 can be aligned with the foot groove 320 of the lower animal keeping device 100.

The two stacked animal keeping devices 100 can be electrically connected through the heterogeneous power-on component 300. When in use, simply connect the animal keeping device 100 located on the bottom layer to an external power source to power on the animal keeping device 100 located on the upper layer of the stack to effectively improve space utilization, allow users to place multiple animal keeping devices 100 in a vertical space, and avoid the problem of multiple animal keeping devices 100 requiring independent wiring.

Referring to FIGS. 1-2, 5, and 11, in one example, the heterogeneous power-on component 300 includes a first electrified end 301 arranged on the surface of the top cover 10 away from the base 30, a second electrified end 302 arranged at a corresponding position of the base 30, and an electrified connection seat 303 respectively connected to the first electrification end 301 and the second electrification end 302; The electrified connection seat 303 is equipped with electrified spring 3031 that matches the first electrified end 301 and the second electrified end 302; The electrified connection seat 303 is embedded between the top cover 10 of the animal keeping device 100 located below the stacking direction and the base 30 of the animal keeping device 100 located above the stacking direction in at least two animal keeping devices 100, in order to achieve electrical connection between the two animal keeping devices 100 located on both sides of the electrified connection seat 303.

It should be noted that the other contents of the animal keeping devices and equipment disclosed in this application can be found in the prior art and will not be repeated here.

In addition, "first", "second", etc. involved in the application are only used for describing purposes, but cannot be interpreted to indicate or imply relative importance or imply and indicate the quantity of indicated technical characteristics. Thus, features defined as "first" and "second" may explicitly or implicitly include at least one feature. In addition, the technical schemes between all the examples can be mutually combined, but the combination must be based on the situation that the combination can be achieved by those of ordinary skill in the art, when the combination of the technical schemes has mutual contradiction or cannot be achieved, it should be thought that the combination of the technical schemes does not exist, and the combination is not within the scope of protection required by the application.

The above description only presents the preferred examples of the application, and it is not for this reason that the patent scope of the application is limited. Any equivalent structural transformation made by using the description of the application and the drawings, or direct/indirect application in other related technical fields under the inventive concept of the application, is included in the patent protection scope of the application.

What is claimed is:

1. An animal keeping device, comprising:
   a top cover, wherein the top cover is equipped with a first integrated component for maintaining internal environmental parameters of the animal keeping device;
   a middle enclosure, wherein the middle enclosure has openings at both ends;
   a base, wherein the base is equipped with a second integrated component for maintaining the internal environmental parameters of the animal keeping device; and the top cover and the base respectively cover the openings at both ends of the middle enclosure to jointly enclose and form a storage space for animal keeping; and
   a conductive component, wherein the conductive component is encapsulated and fixed inside the middle enclosure and partially exposed on a surface of the middle enclosure; and the conductive component is used for electrical connection,
   wherein after the top cover, the middle enclosure and the base are assembled and fixed, the first integrated component is electrically connected to the second integrated component through the conductive component,
   wherein the conductive component comprises at least two conductive end seats and at least one conductive wire group; every two conductive end seats of the at least two conductive end seats form a conductive end seat pair; two conductive end seats in each conductive end seat pair are connected to a single conductive wire group of the at least one conductive wire group to enable electric connection between the two conductive end seats in each conductive end seat pair; the two conductive end seats in each conductive end seat pair are respectively arranged at an end, assembled with the top cover, of the middle enclosure and at an end, assembled with the base, of the middle enclosure; and the two conductive end seats in each conductive end seat pair are opposite to each other;
   the conductive component further comprises at least one top cover matching end seat and at least one base matching end seat; the at least one top cover matching end seat and at least one base matching end seat form at least one matching end seat pair in a one-to-one manner; a top cover matching end seat and a base matching end seat in each matching end seat pair are respectively arranged, at positions corresponding to the two conductive end seats in each conductive end seat pair, on the top cover and the base; the first integrated component is electrically connected to the at least one top cover matching end seat; and the second integrated component is electrically connected to the at least one base matching end seat; and
   after the top cover, the middle enclosure and the base are assembled and fixed, the top cover matching end seat and the base matching end seat in each matching end seat pair are connected to the two conductive end seats in each conductive end seat pair, so that the first integrated component is electrically connected with the second integrated component,
   wherein the middle enclosure comprises at least one column and at least one enclosure board; and the at least one enclosure board is fixed along a length direction of the least one column to form an enclosure structure with the openings at both ends; and
   the two conductive end seats are respectively arranged in opposite ends of a single column of the at least one column along a length direction of the single column of the at least one column; and the single conductive wire group is encapsulated and arranged inside the single column of the at least one column,
   wherein the at least one conductive wire group, the at least two conductive end seats, the at least one top cover matching end seat and the at least one base matching end seat are each configured as an electrically conductive element.

2. The animal keeping device according to claim 1, wherein the at least one column comprises four columns; the at least one enclosure board comprises four enclosure boards which are sequentially connected to form the enclosure structure with the openings at both ends; the four columns are each fixed between adjacent two enclosure boards and serve as connecting axes for the four enclosure boards; and
   the at least two conductive end seats comprise four conductive end seats which form two pairs; each pair of conductive end seats is arranged in both ends of a respective column of the four columns in a length direction of the respective column; the at least one conductive wire group comprises two conductive wire groups, the at least one top cover matching end seat comprises two top cover matching end seats, and the at least one base matching end seat comprises two base matching end seats.

3. The animal keeping device according to claim 1, wherein the top cover is equipped with a foolproof structure corresponding to the conductive component.

4. The animal keeping device according to claim 3, wherein the foolproof structure is connected to a side, facing the middle enclosure, of the top cover and extends towards a direction close to the middle enclosure.

5. The animal keeping device according to claim 4, wherein the foolproof structure is in the shape of a sheet and adapted to an outer edge of a corresponding column of the at least one column, and the foolproof structure is connected to the side, facing the middle enclosure, of the top cover and located on an outer circumference of a corresponding top cover matching end seat of the least one top cover matching end seat.

6. The animal keeping device according to claim 4, wherein the foolproof structure is configured as a protruding bar protruding in a length direction of a corresponding column of the at least one column and coaxial with the corresponding column of the at least one column; the protruding bar is connected to the side, facing the corresponding column of the at least one column, of the top cover and located at a center of a top cover matching end seat, corresponding to the corresponding column of the at least one column, of the at least one top cover matching end seat;

and a conductive end seat, corresponding to the protruding bar, of the at least one conductive end seat is adapted to the protruding bar with a central hole, so that the top cover can be connected to the corresponding column of the at least one column with insertion of the protruding bar to the central hole during assembly of the top cover with the corresponding column of the at least one column.

7. The animal keeping device according to claim 1, further comprising: a mounting bolt for fixing and connecting the top cover, a corresponding column of the at least one column and the base, wherein
 the base is provided with a threaded installation groove, and the top cover is provided with a mounting hole corresponding to the threaded installation groove;
 the corresponding column of the at least one column is provided with a hollow inner groove for the mounting bolt to pass through; and
 the mounting bolt passes through the top cover and the corresponding column of the at least one column in sequence to be connected into the threaded installation groove so as to tightly fix the corresponding column of the at least one column between the top cover and the base.

8. The animal keeping device according to claim 7, wherein the top cover, the at least one column and the base are each equipped with an insertion groove for the enclosure board to be inserted.

9. The animal keeping device according to claim 1, wherein the first integrated component comprises an exhaust fan and a light module, and the second integrated component comprises a heating pad.

10. An animal keeping equipment, comprising: at least two animal keeping devices each according to claim 1 and at least one heterogeneous power-on component, wherein
 the at least two animal keeping devices are stacked along a central axis direction of bases and top covers of the at least two animal keeping devices; and a contact point of the at least two animal keeping devices is equipped with the heterogeneous power-on component for electrical connection between the at least two animal keeping devices.

11. The animal keeping equipment according to claim 10, wherein the at least one heterogeneous power-on component each comprise:
 a first electrified end arranged on a surface, away from a base of an animal keeping device of the at least two animal keeping devices, of a top cover of the animal keeping device;
 a second electrified end arranged at a corresponding position of a base of another animal keeping device, adjacent to and located above the animal keeping device along the central axis direction, of the at least two animal keeping devices, and
 an electrified connection seat connected to the first electrified end and the second electrified end, wherein
 the electrified connection seat is embedded between the top cover of the animal keeping device and the base of the another animal keeping device, for electrical connection between the animal keeping device and the another animal keeping device.

\* \* \* \* \*